(12) United States Patent
Steckelberg

(10) Patent No.: US 6,187,912 B1
(45) Date of Patent: Feb. 13, 2001

(54) DISAZO COMPOUND THEIR PREPARATION AND THEIR USE AS DYESTUFFS

(75) Inventor: Joachim Steckelberg, Hofheim (DE)

(73) Assignee: Dystar Textifarben GmbH & Co. (DE)

( * ) Notice: Under 35 U.S.C. 154(b), the term of this patent shall be extended for 0 days.

(21) Appl. No.: 09/479,711

(22) Filed: Jan. 7, 2000

(51) Int. Cl.$^7$ .................. C09B 62/01; C09B 62/513; D06P 1/38
(52) U.S. Cl. .................. 534/635; 534/637; 534/642; 534/643
(58) Field of Search .................. 534/635, 637, 534/642, 643

(56) References Cited

U.S. PATENT DOCUMENTS 3,420,812   1/1969   Langheim et al. .................. 534/642

OTHER PUBLICATIONS

Chemical Abstracts, 67:118089, 1967.*

\* cited by examiner

*Primary Examiner*—Fiona T. Powers
(74) *Attorney, Agent, or Firm*—Connolly Bove Lodge & Hutz LLP

(57) ABSTRACT

Disazo compounds, processes for their preparation and their use as dyestuffs Described are fiber-reactive, water-soluble disazo compounds corresponding to the formula (1) given below, which are capable of dyeing fiber material containing hydroxy, amino, thiol and/or carboxamido groups, such as cellulose fibers, for example cotton, regenerated cellulose fibers, wool and synthetic polyamide fibers, in a high intensity and with good fastness properties.

(1)

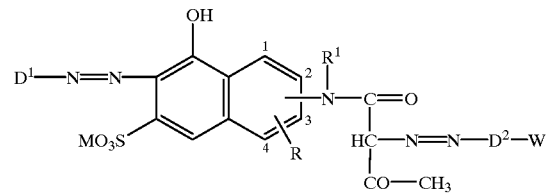

in which: $W^2$ is a particular fiber-reactive grouping, $D^1$ is phenyl or naphthyl, each optionally substituted by substituents customary in dyestuffs, and $D^2$ is phenylene or naphthylene optionally substituted by substituents customary in dyestuffs, M is hydrogen or an alkali metal, R is hydrogen or sulfo and $R^1$ is hydrogen, optionally substituted lower alkyl or optionally substituted phenyl.

19 Claims, No Drawings

DISAZO COMPOUND THEIR PREPARATION AND THEIR USE AS DYESTUFFS

DESCRIPTION

Disazo compounds, their preparation and their use as dyestuffs

With respect to the dyeing quality of dyestuffs which have a fiber-reactive group, and the dyeings obtainable with them, customers are imposing ever higher requirements regarding fastness properties during processing and use. In the red sector in particular, dyestuffs are expected which not only have a high tinctorial strength but are also highly fast in depth of color and color shade in respect of the properties of their dyeings during use and processing.

The present invention now provides novel disazo compounds which correspond to the formula (1)

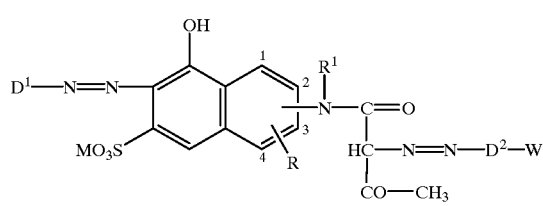

(1)

in which:

M is hydrogen or an alkali metal, such as lithium, sodium or potassium, and is preferably hydrogen or potassium and particularly preferably lithium or sodium;

R is hydrogen or sulfo bonded in the 2- or 3- or 4-position of the 6-sulfo-8-naphthol radical;

$R_1$ is hydrogen or alkyl having 1 to 6 carbon atoms, such as methyl, ethyl and propyl, which can be substituted, such as, for example, by sulfo, carboxy, hydroxy, halogen, such as chlorine, alkoxy having 1 to 4 carbon atoms, such as methoxy and ethoxy, alkanoyloxy of 2 to 5 carbon atoms, such as acetyloxy, alkanoylamino of 2 to 5 carbon atoms, such as acetylamino, or ureido, or is phenyl, which can be substituted, such as, for example, by 1 or 2 substituents selected from the group consisting of sulfo, carboxy, hydroxy, halogen, such as chlorine, bromine and fluorine, alkoxy having 1 to 4 carbon atoms, such as methoxy and ethoxy, alkyl having 1 to 4 carbon atoms, such as methyl and ethyl, amino, sulfamoyl, carbamoyl, alkanoylamino having 2 to 5 carbon atoms, such as acetylamino, and ureido, and is preferably hydrogen, methyl or ethyl;

$D_1$ is phenyl or naphthyl, each optionally substituted by 1, 2 or 3 substituents chosen from the following group of substituents: fluorine, chlorine, cyano, alkyl having 1 to 4 carbon atoms, such as ethyl and, in particular, methyl, alkoxy having 1 to 4 carbon atoms, such as ethoxy and, in particular, methoxy, sulfo, carboxy, amino, hydroxy, alkylamino having 1 to 4 carbon atoms, such as ethylamino and methylamino, sulfamoyl, carbamoyl, alkylsulfonyl having 1 to 4 carbon atoms, such as methylsulfonyl and ethylsulfonyl, alkanoyl having 2 to 5 carbon atoms, such as acetyl and propionyl, alkanoylamino having 2 to 5 carbon atoms, such as acetylamino and propionylamino, benzoyl, benzoylamino, sulfobenzoylamino, methylbenzoylamino, a group of the formula (a) and a group of the formula (b)

—CO—O—$R^2$ (a)

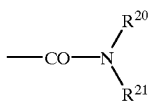

(b)

in which $R^2$ is alkyl having 1 to 4 carbon atoms, such as methyl and ethyl, or is phenyl or phenyl which is substituted by substituents selected from methyl, ethyl, methoxy, ethoxy, chlorine, sulfo and carboxy, $R^{20}$ is hydrogen or alkyl having 1 to 4 carbon atoms, such as methyl and ethyl, which can be substituted by hydroxy, sulfato, phosphato, acetyloxy, propionyloxy, sulfo, carboxy or alkoxy having 1 to 4 carbon atoms, such as methoxy and ethoxy, and $R^{21}$ is alkyl having 1 to 4 carbon atoms, such as methyl and ethyl, which can be substituted by hydroxy, sulfato, phosphato, acetyloxy, propionyloxy, sulfo, carboxy or phenyl, or is phenyl optionally substituted by 1 or 2 substituents selected from the group consisting of alkyl having 1 to 4 carbon atoms, such as ethyl and, in particular, methyl, alkoxy having 1 to 4 carbon atoms, such as ethoxy and, in particular, methoxy, chlorine, sulfo and carboxy;

$D^2$ is a phenylene or naphthylene, each optionally substituted by 1, 2 or 3 substituents chosen from the following group of substituents: fluorine, chlorine, cyano, alkyl having 1 to 4 carbon atoms, such as ethyl and, in particular, methyl, alkoxy having 1 to 4 carbon atoms, such as ethoxy and, in particular, methoxy, sulfo, carboxy, amino, hydroxy, alkylamino having 1 to 4 carbon atoms, such as ethylamino and methylamino, sulfamoyl, carbamoyl, alkylsulfonyl having 1 to 4 carbon atoms, such as methylsulfonyl and ethylsulfonyl, alkanoyl having 2 to 5 carbon atoms, such as acetyl and propionyl, alkanoylamino having 2 to 5 carbon atoms, such as acetylamino and propionylamino, benzoyl, benzoylamino, sulfobenzoylamino, methylbenzoylamino, a group of the formula (a) and a group of the formula (b) mentioned and defined above;

W is a group of the formula —$SO_2$—Y or a group of the formula (2), (3), (4), (5) or (6)

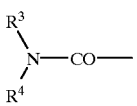

(2)

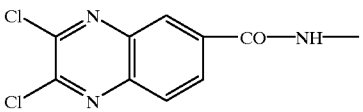

(3)

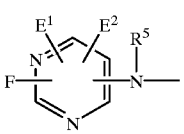

(4)

-continued

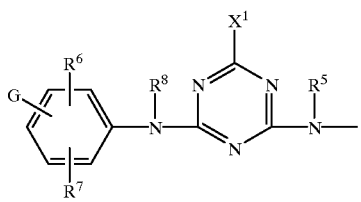

(5)

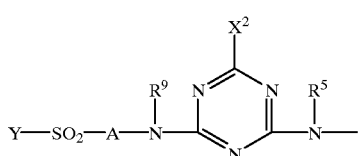

(6)

in which
Y is vinyl or is ethyl which is substituted in the β-position by a substituent which is eliminated under the action of an alkaline reacting compound to form the vinyl group, such as, for example, by chlorine, sulfato, thiosulfato, phosphate and acetyloxy, and is preferably vinyl or β-sulfatoethyl;
$R_3$ is a group of the formula (c)

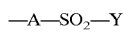 (c)

in which
Y has one of the abovementioned meanings and
A is alkylene having 1 to 4 carbon atoms, such as n-ethylene and n-propylene, or alkylene having 3 to 6 carbon atoms which is interrupted by 1 or 2 hetero groups from the group consisting of —O—and —NH—, such as, for example, a group of the formula —CH$_2$—CH$_2$—O—CH$_2$—CH$_2$—, or is phenylene, which can be substituted by 1 or 2 substituents selected from the group consisting of alkoxy having 1 to 4 carbon atoms, such as ethoxy and, in particular, methoxy, alkyl having 1 to 4 carbon atoms, such as ethyl and, in particular, methyl, chlorine, sulfo and carboxy, or is naphthylene unsubstituted or substituted by 1 or 2 sulfo groups;
$R^4$ is hydrogen or alkyl having 1 to 4 carbon atoms, such as methyl and ethyl, which can be substituted by hydroxy, sulfato, phosphate, acetyloxy, propionyloxy, sulfo, carboxy or phenyl, or is phenyl, which can be substituted by 1 or 2 substituents selected from the group consisting of alkyl having 1 to 4 carbon atoms, such as ethyl and, in particular, methyl, alkoxy having 1 to 4 carbon atoms, such as ethoxy and, in particular, methoxy, chlorine, sulfo and carboxy, or is an abovementioned and defined group of the formula (c);
$E^1$ is hydrogen or fluorine, preferably fluorine;
$E^2$ is hydrogen, chlorine or fluorine, preferably hydrogen or chlorine;
$R^5$ is hydrogen or alkyl having 1 to 4 carbon atoms, such as ethyl or methyl;
$R^6$ is hydrogen, fluorine, chlorine, nitro, amino, hydroxy, sulfo, carboxy, alkyl having 1 to 4 carbon atoms, such as ethyl and, in particular, methyl, alkoxy having 1 to 4 carbon atoms, such as ethoxy and, in particular, methoxy, sulfamoyl, carbamoyl, alkanoylamino having 2 to 5 carbon atoms, such as acetylamino, or alkylamino having 1 to 4 carbon atoms, such as methylamino and ethylamino, and is preferably hydrogen, methyl, ethyl, methoxy, ethoxy, sulfo and carboxy;
$R^7$ has one of the meanings of $R^6$;

$R^8$ is hydrogen or alkyl having 1 to 4 carbon atoms, such as methyl and ethyl;
$R^9$ is hydrogen, alkyl having 1 to 4 carbon atoms, such as methyl and ethyl, or is phenyl or phenyl which is substituted by 1 or 2 substituents selected from the group consisting of chlorine, methyl, ethyl, methoxy, ethoxy, sulfo and carboxy, and is preferably hydrogen, methyl, ethyl, phenyl and sulfophenyl;
$X^1$ is fluorine, chlorine, hydroxy, amino, cyanoamino, alkoxy having 1 to 6 carbon atoms, such as methoxy and ethoxy, which can optionally be substituted, such as, for example, by methoxy or ethoxy, or is a group of the formula —NR$^{10}$R$^{11}$, in which R$^{10}$ is hydrogen or alkyl having 1 to 6 carbon atoms, such as methyl and ethyl, and R$^{11}$ has one of the meanings of R$^{10}$ or is phenyl, which can be substituted, such as, for example, by 1 or 2 substituents selected from the group consisting of sulfo, carboxy, methyl, ethyl, methoxy and ethoxy, or the group —NR$^{10}$R$^{11}$ is the radical of a 5- or 6-membered saturated heterocyclic ring, the alkylene radical of which can also be interrupted by a hetero group, such as, for example, by —O—or —NH—, such as, for example, morpholino and piperazino, and $X^1$ is preferably chlorine, fluorine or cyanoamino;
$X^2$ has one of the meanings of $X^1$;
G is hydrogen or a group of the formula —SO$_2$—Y, where Y has one of the abovementioned meanings, and where G is preferably —SO$_2$—Y if $X^1$ is fluorine;
the amino group —N(R$^1$)— bonded to the acetoacetyl grouping, is bonded to the 6-sulfo-8-naphthol radical in the 1-, 2- or 3-position, preferably in the 1-position in the case where R is sulfo.

Preferably, $D^1$ is phenyl optionally substituted and preferably substituted by 1 or 2 substituents selected from the group consisting of alkyl having 1 to 4 carbon atoms, such as ethyl and, in particular, methyl, alkoxy having 1 to 4 carbon atoms, such as ethoxy and, in particular, methoxy, chlorine, sulfo and carboxy, and $D^1$ is preferably naphthyl optionally substituted and preferably substituted by 1 or 2 sulfo groups, and the azo group is preferably bonded to the naphthyl in the 2-position.

$D^2$ is preferably phenylene optionally substituted by 1 or 2 substituents selected from the group consisting of alkyl having 1 to 4 carbon atoms, such as ethyl and, in particular, methyl, alkoxy having 1 to 4 carbon atoms, such as ethoxy and, in particular, methoxy, chlorine, sulfo and carboxy, and is preferably naphthylene optionally substituted and preferably substituted by 1 or 2 sulfo groups, and the azo group is preferably bonded to the naphthylene in the 2-position.

In the abovementioned formulae and also in the following formulae, the individual members of the formulae both of a different and of the same meaning within a formula can have meanings which are identical to one another or different from one another in the context of their definition.

The groups "sulfo", "carboxy", "thiosulfato", "phosphate" and "sulfato" include both the acid form thereof and the salt form thereof. Accordingly, sulfo groups are groups corresponding to the formula —SO$_3$M, carboxy groups are groups corresponding to the formula —COOM, thiosulfato groups are groups corresponding to the formula —S—SO$_3$M, phosphate groups are groups corresponding to the formula —OPO$_3$M$_2$ and sulfato groups are groups corresponding to the formula —OSO$_3$M, in which M has the abovementioned meaning.

Groups of the formula radical $D^1$ are, for example, 2-sulfophenyl, 3-sulfophenyl, 4-sulfophenyl, 2,5-disulfophenyl, 2-sulfo-4-methylphenyl, 2-sulfo-4-methoxyphenyl and 2,5-disulfo-4-sulfophenyl.

Groups corresponding to the formula —D²—W, where W is a group of the formula —SO₂—Y, are, for example, 2-(β-sulfatoethylsulfonyl)-phenyl, 3-(β-sulfatoethylsulfonyl)-phenyl, 4-(β-sulfatoethylsulfonyl)-phenyl, 2-carboxy-5-(β-sulfatoethylsulfonyl)-phenyl, 2-chloro-3-(sulfatoethylsulfonyl)-phenyl, 2-chloro-4-(β-sulfatoethylsulfonyl)-phenyl, 2-bromo-4-(β-sulfatoethylsulfonyl)-phenyl, 4-methoxy-3-(β-sulfatoethylsulfonyl)-phenyl, 4-chloro-3-(β-sulfatoethylsulfonyl)-phenyl, 2-ethoxy-4- or -5-(β-sulfatoethylsulfonyl)-phenyl, 2-methyl-4-(β-sulfatoethylsulfonyl)-phenyl, 2-methoxy-5- or -4-(β-sulfatoethylsulfonyl)-phenyl, 2,4-diethoxy-5-(β-sulfatoethylsulfonyl)-phenyl, 2,4-dimethoxy-5-(β-sulfatoethylsulfonyl)-phenyl, 2,5-dimethoxy-4-(β-sulfatoethylsulfonyl)-phenyl, 2-methoxy-5-methyl-4-(β-sulfatoethylsulfonyl)-phenyl, 2- or 3- or 4-(β-thiosulfatoethylsulfonyl)-phenyl, 2-methoxy-5-(β-thiosulfatoethylsulfonyl)-phenyl, 2-sulfo-4-(β-phosphatoethylsulfonyl)-phenyl, 2-sulfo-4-vinylsulfonyl-phenyl, 2-hydroxy-4- or -5-(β-sulfatoethylsulfonyl)-phenyl, 2-chloro-4- or -5-(β-chloroethylsulfonyl)-phenyl, 2-hydroxy-5-(β-sulfatoethylsulfonyl)-phenyl, 2-hydroxy-3-sulfo-5-(β-sulfatoethylsulfonyl)-phenyl, 3- or 4-(β-acetoxyethylsulfonyl)-phenyl, 5-(β-sulfatoethylsulfonyl)-naphth-2-yl, 6- or 7-or 8-(β-sulfatoethylsulfonyl)-naphth-2-yl, 6-(β-sulfatoethylsulfonyl)-1-sulfonaphth-2-yl, 5-(β-sulfatoethylsulfonyl)-1-sulfonaphth-2-yl and 8-(β-sulfatoethylsulfonyl)-6-sulfonaphth-2-yl.

Groups corresponding to the formula Y—SO₂—A— are, for example, 2-(β-sulfatoethylsulfonyl)-phenyl, 3-(β-sulfatoethylsulfonyl)-phenyl, 4-(β-sulfatoethylsulfonyl)-phenyl, 2-carboxy-5-(β-sulfatoethylsulfonyl)-phenyl, 2-chloro-3-(sulfatoethylsulfonyl)-phenyl, 2-chloro-4-(β-sulfatoethylsulfonyl)-phenyl, 2-bromo-4-(β-sulfatoethylsulfonyl)-phenyl, 4-methoxy-3-(β-sulfatoethylsulfonyl)-phenyl, 4-chloro-3-(β-sulfatoethylsulfonyl)-phenyl, 2-ethoxy-4- or -5-(β-sulfatoethylsulfonyl)-phenyl, 2-methyl-4-(β-sulfatoethylsulfonyl)-phenyl, 2-methoxy-5-or -4-(β-sulfatoethylsulfonyl)-phenyl, 2,4-diethoxy-5-(β-sulfatoethylsulfonyl)-phenyl, 2,4-dimethoxy-5-(β-sulfatoethylsulfonyl)-phenyl, 2,5-dimethoxy-4-(β-sulfatoethylsulfonyl)-phenyl, 2-methoxy-5-methyl-4-(β-sulfatoethylsulfonyl)-phenyl, 2- or 3- or 4-(β-thiosulfatoethylsulfonyl)-phenyl, 2-methoxy-5-(β-thiosulfatoethylsulfonyl)-phenyl, 2-sulfo-4-(β-phosphatoethylsulfonyl)-phenyl, 2-sulfo-4-vinylsulfonyl-phenyl, 2-hydroxy-4- or -5-(β-sulfatoethylsulfonyl)-phenyl, 2-chloro-4- or -5-(β-chloroethylsulfonyl)-phenyl, 2-hydroxy-5-(β-sulfatoethylsulfonyl)-phenyl, 2-hydroxy-3-sulfo-5-(β-sulfatoethylsulfonyl)-phenyl, 3- or 4-(β-acetoxyethylsulfonyl)-phenyl, 5-(β-sulfatoethylsulfonyl)-naphth-2-yl, 6- or 7- or 8-(β-sulfatoethylsulfonyl)-naphth-2-yl, 6-(β-sulfatoethylsulfonyl)-1 -sulfo-naphth-2-yl, 5-(β-sulfatoethylsulfonyl)-1-sulfo-naphth-2-yl, 8-(β-sulfatoethylsulfonyl)-6-sulfo-naphth-2-yl, β-(vinylsulfonyl)-ethyl, β-(β'-chloroethylsulfonyl)-ethyl, β-(β'-sulfatoethylsulfonyl)-ethyl, γ-(β'-chloroethylsulfonyl)-propyl, γ-(β'-sulfatoethylsulfonyl)-propyl, β-(vinylsulfonyl)-ethyl, γ-(vinylsulfonyl)-propyl, N-phenyl-N-[β-(β'-sulfatoethylsulfonyl)]-ethyl, N-phenyl-N-[β-(β'-chloroethylsulfonyl)]-ethyl, N-phenyl-N-[γ-(β'-chloroethylsulfonyl)]-propyl, N-phenyl-N-[γ-(β'-sulfatoethylsulfonyl)]-propyl, N-(4'-sulfo-phenyl)-N-[β-(β'-sulfatoethylsulfonyl)]-ethyl, N-(4'-sulfo-phenyl)-N-[β-(β'-chloroethylsulfonyl)]-ethyl, N-(4'-sulfo-phenyl)-N-[γ-(β'-sulfatoethylsulfonyl)]-propyl, N-(4'-sulfo-phenyl)-N-[γ-(β'-chloroethylsulfonyl)]-propyl, N-(3'-sulfo-phenyl)-N-[β-(β'-sulfatoethylsulfonyl)]-ethyl, N-(3'-sulfo-phenyl)-N-[β-(β'-chloroethylsulfonyl)]-ethyl, N-(3'-sulfo-phenyl)-N-[γ-(β'-chloroethylsulfonyl)]-propyl and N-(3'-sulfo-phenyl)-N-[γ-(β'-sulfatoethylsulfonyl)]-propyl.

Heterocyclic fiber-reactive radicals corresponding to the formula (4) are, for example, 2,4-difluoro-5-chloro-pyrimidin-6-yl, 2,4-difluoro-pyrimidin-6-yl, 4,6-difluoro-5-chloro-pyrimidin-2-yl and 4,6-difluoro-pyrimidin-4-yl.

The present invention furthermore relates to processes for the preparation of the disazo compounds of the formula (1) according to the invention, for example by coupling a diazonium salt compound of an amine of the formula D¹—NH₂ where D¹ is defined as above, with a compound of the formula (7)

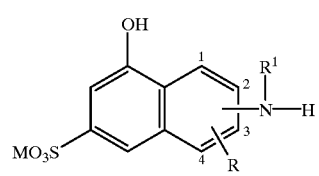

(7)

in which M, R and R¹ have the abovementioned meanings, R is bonded in the 2-, 3- or 4-position of the 6-sulfo-8-naphthol radical and the amino group —N(R¹)H is bonded to the 6-sulfo-8-naphthol radical in the 1-, 2- or 3-position, in the customary manner, such as at a temperature of between 5 and 20° C. and a pH of between 4 and 7, reacting the azo compound thus prepared with diketene at a temperature of 20 to 70° C., preferably 30 to 50° C., and a pH of 4 to 11, preferably 5 to 8, to give the compound of the formula (8)

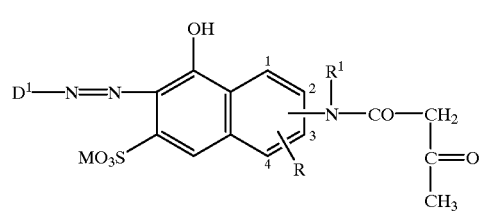

(8)

in which the individual members of the formula have the abovementioned meanings, and then coupling it with a diazonium salt compound of an amine of the formula H₂N—D²—W where D² and W have the abovementioned meaning, in the customary manner, such as at a temperature of between 5 and 20° C. and a pH of between 4 and 7, to give the compound of the formula (1), or by reacting a compound of the formula (6) with diketene at a temperature of 20 to 60° C., preferably 30 to 50° C., and at a pH of 4 to 11, preferably 5 to 8, and coupling the acetoacetylamino-mono- or -disulfo-naphthol compound thus obtained with the diazonium salt of an amine of the formula D¹—NH₂ where D¹ has the abovementioned meaning, and with a second diazonium salt of an amine of the formula H₂N—D²—W where D² and W have the abovementioned meaning, at a pH of between 4 and 7 and at a temperature of between 5 and 20° C.

Starting compounds of the formula (7) are, for example, 1-amino-8-naphthol-3,6-disulfonic acid, 1-amino-8-naphthol-4,6-disulfonic acid, 3-amino-8-naphthol-6-sulfonic acid, 3-methylamino-8-naphthol-6-sulfonic acid, 2-amino-8-naphthol-6-sulfonic acid, 3-amino-8-naphthol-4, 6-disulfonic acid, 1-amino-8-naphthol-6-sulfonic acid and 2-amino-8-naphthol-3,6-disulfonic acid, preferably 1-amino-8-naphthol-3,6-disulfonic acid, 3-amino-8-naphthol-6-sulfonic acid, 3-methylamino-8-naphthol-6-sulfonic acid and 2-amino-8-naphthol-6-sulfonic acid.

Starting compounds of the formula $H(R^5)N$—$D^2$—$NH_2$ are, for example, 1,4-diamino-benzene, 1,3-diamino-benzene, 2-sulfo-1,4-diaminobenzene, 4-sulfo-1,3-diaminobenzene, 4,6-disulfo-1,3-diaminobenzene, 2,5-disulfo-1,4-diaminobenzene, 2-methyl-1,4-diaminobenzene, 4-methyl-1,3-diaminobenzene, 4-sulfo-6-methyl-1,3-diaminobenzene and 4-sulfo-6-methoxy-1,3-diaminobenzene, Amino compounds of the formula W—$D^2$—$NH_2$, in which W is a radical of the formula (3), (4), (5) or (6) can be prepared, for example, by reacting a compound of the formula (3A) or (4A) or (5A) or (6A) respectively

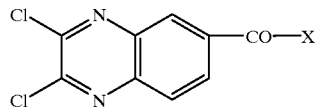
(3A)

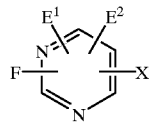
(4A)

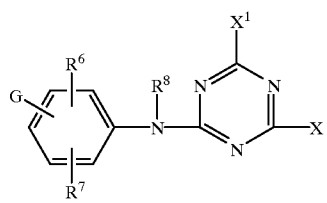
(5A)

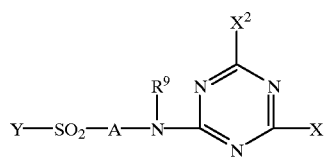
(6A)

in which X is halogen, such as chlorine or fluorine, and the other members of the formulae have the abovementioned meanings, with a diamino compound of the formula $H(R^5)N$—$D^2$—$NH_2$, where $D^2$ and $R^5$ have the abovementioned meaning, in a procedure which is customary per se for reaction of acid halides or halogenopyrimidines and halogenotriazines with amino compounds, it being possible for the free amino group $NH_2$ in the diamino compounds to contain an acyl group as a protective group which is split off again later. However, the formula radicals (3) to (6) can also be introduced into the corresponding precursors of the disazo compound of the formula (1), for example by reacting a compound of the formula (9a) or (9b)

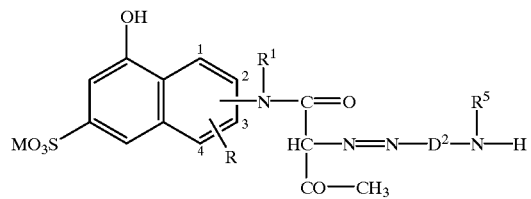
(9a)

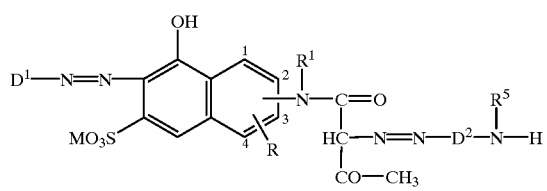
(9b)

in which the individual members of the formula have the abovementioned meanings, with a compound of the formula (3A) or (4A) or (5A) or (6A) respectively in a procedure which is known and customary per se.

Starting compounds corresponding to the formula (4A) are, for example, 2,4,6-difluoro-5-chloro-pyrimidine and 2,4,6-trifluoro-pyrimidine.

The disazo compounds of the formula (1)—called compounds (1) in the following—prepared according to the invention are separated off from the synthesis batches by generally known methods, either by precipitation from the reaction medium by means of electrolytes, such as, for example, sodium chloride or potassium chloride, or by evaporation of the reaction solution, for example by spray drying, it being possible to add a buffer substance to this reaction solution.

The compounds (1) have fiber-reactive properties and have very good dyestuff properties. They can therefore be used for dyeing fibers containing hydroxy, amino, thiol and/or carboxamido groups, such as, for example, naturally occurring or regenerated cellulose fiber materials, such as cotton, linen and viscose, as well as regenerated cellulose fiber materials, such as cotton, linen and viscose, as well as wool and synthetic polyamide fibers, producing highly fast orange to bluish-tinged red dyeings on these fiber materials, in particular cellulose fiber materials.

The present invention therefore also relates to the use of the compounds (1) for dyeing such fibers and to processes for dyeing such fibers in which the compound (1) is applied to the fiber material and is fixed on the fiber by means of heat or by means of an alkaline agent or by means of both measures. The fibers are preferably used in the form of textile fibers, such as in the form of woven fabrics and yarns, for example in the form of hanks and wound packages.

The compounds (1) according to the invention can be applied and fixed to the fiber materials mentioned by the use techniques for water-soluble dyestuffs, in particular for fiber-reactive dyestuffs, such as dyeing and printing processes; such use processes are known in numerous instances from the literature for water-soluble fiber-reactive dyestuffs and are described, for example, in EP-A-0 688 831.

The compounds (1) can be in the form of a preparation in solid or in liquid (dissolved) form. In the solid form, they comprise, in general, the electrolyte salts customary with water-soluble and, in particular, fiber-reactive dyestuffs, such as sodium chloride, potassium chloride and sodium sulfate, and can furthermore comprise the auxiliaries customary in commercial dyestuffs, such as buffer substances which are capable of establishing a pH in aqueous solution of between 3 and 7, such as sodium acetate, sodium borate, sodium bicarbonate, sodium dihydrogen phosphate and disodium hydrogen phosphate, and small amounts of siccatives. If they are in the form of a liquid aqueous solution (including the content of thickeners such as are customary in printing pastes), they can also comprise the substances mentioned (apart from the siccatives) in dissolved form, and additionally substances which ensure the stability of these preparations, such as, for example, mold-preventing agents.

The compounds (1) are in general in the form of powders or granules comprising electrolyte salts with a content of the compound (1) of 10 to 80% by weight, based on the powder or granules or the preparation. They can furthermore comprise the buffer substances mentioned in a total amount of up to 10% by weight, based on the powder or granules or the preparation. If the compounds (1) are in the form of an aqueous solution, their content in these aqueous solutions is up to about 50% by weight, such as, for example, between 5 and 40% by weight, the electrolyte salt content in these aqueous solutions preferably being below 10% by weight, based on the aqueous solution; the aqueous solutions (liquid preparations) can as a rule comprise the buffer substances mentioned in an amount of up to 10% by weight, preferably up to 2% by weight.

The following Examples serve to illustrate the invention. The parts are parts by weight and the percentage data are percentages by weight, unless noted otherwise. Parts by weight bear the same relation to parts by volume as the kilogram to the liter. The compounds described by way of formulae in the Examples are given in the form of the free acid; in general, they are prepared and isolated in the form of their alkali metal salts, such as lithium, sodium or potassium salts, and are used for dyeing in the form of their salts. The starting compounds and components mentioned in the form of the free acid in the following Examples, in particular the Tabular Examples, can likewise be employed in the synthesis as such or in the form of their salts, preferably alkali metal salts.

prepared is added to a neutral solution of the sodium salt of 319 parts of 3,6-disulfo-1-amino-8-hydroxy-naphthalene in 1000 parts of water at a temperature of 10° C. and while maintaining a pH of above 7, with stirring.

When the coupling reaction has ended, the mixture is brought to a pH of 7 and 100 parts of diketene are added at a temperature of 40 to 60° C. and a pH of 4 to 8, while continuing to stir thoroughly. Stirring of the mixture is continued for about a further three hours, and the mixture is then heated to 100° C. in order to destroy excess diketene and subsequently brought to a pH of 7, and the resulting compound of the formula (A)

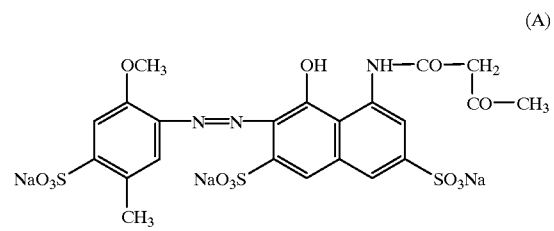

(A)

is isolated by distilling off the water under reduced pressure.

In a manner analogous to that described initially for 2-methoxy-4-sulfo-5-methyl-aniline, 281 parts of 4-(β-sulfatoethylsulfonyl)-aniline are diazotized and the diazonium salt suspension thus obtained is stirred into an aqueous solution of 200 parts of the initially prepared acetoacetylamino-naphthol-azo compound of the formula (A) in 1000 parts of water at a pH of between 3 and 7 and at a temperature of about 10° C. Stirring is continued for a further period of time until the coupling reaction has ended, and, after bringing the synthesis solution to a pH of 6.5, the resulting disazo compound according to the invention is isolated by salting out as the sodium salt by means of 250 parts of sodium chloride.

It has, written in the form of the free acid, the formula

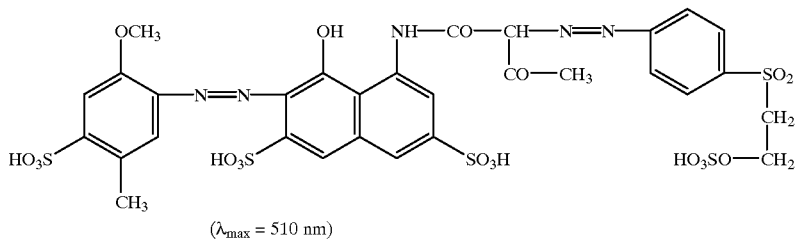

($\lambda_{max}$ = 510 nm)

The absorption maxima ($\lambda_{max}$) stated for the visible range for the compounds (1) according to the invention were determined with the aid of their alkali metal salts in aqueous solution. In the Tabular Examples, the $\lambda_{max}$ values are in parentheses by the color shade stated; the wavelength stated is in nm.

EXAMPLE 1

217 parts of 2-methoxy-4-sulfo-5-aniline are diazotized with 69 parts of sodium nitrite and 350 parts of a 31% strength aqueous hydrochloric acid in the customary manner at about 0° C. in 1000 parts of water, with the addition of about 500 parts of ice, excess nitrous acid is destroyed with amidosulfonic acid and the diazonium salt solution thus and shows very good fiber-reactive dyestuff properties. It dyes the fiber materials mentioned in the description, such as, for example, cotton, in intense red shades with good fastness properties, of which the fastnesses to washing and chlorine can be emphasized in particular.

EXAMPLE 2

To prepare a disazo compound according to the invention, the procedure according to Example 1 is followed, but instead of the 3,6-disulfo-1-amino-8-hydroxy-naphthalene compound, the 3,6-disulfo-2-amino-8-hydroxy-naphthalene compound is employed in the same amount.

The disazo compound according to the invention thus obtained, of the formula (written in the form of the free acid)

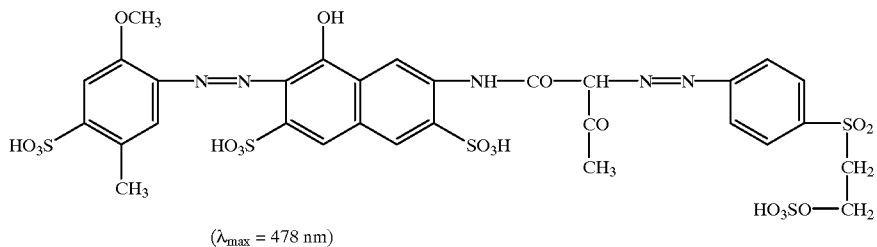

($\lambda_{max}$ = 478 nm)

also has very good fiber-reactive dyestuff properties and gives, by the dyeing and printing processes customary in the art for fiber-reactive dyestuffs, intense dyeings and prints in orange shades with good fastness properties, of which the fastnesses to chlorine can be emphasized in particular.

EXAMPLE 3

To prepare a disazo compound according to the invention, the procedure according to Example 1 is followed, but instead of the 2-methoxy-4-sulfo-5-methyl-aniline compound, 2-sulfo-aniline is employed, and instead of the 3,6-disulfo-1-amino-8-hydroxy-naphthyl compound, 2-amino-6-sulfo-8-hydroxy-naphthalene is employed, in each case in equivalent amounts.

The disazo compound according to the invention obtained as the sodium salt has, written in the form of the free acid, the formula

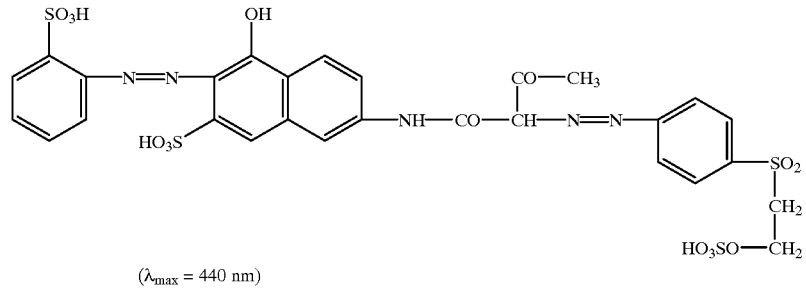

($\lambda_{max}$ = 440 nm)

and dyes cotton, for example, in intense orange shades with good fastness properties, of which the fastnesses to washing and chlorine may be emphasized in particular.

EXAMPLES 4 to 24

Further disazo compounds according to the invention, corresponding to the formula (1A)

(1A)

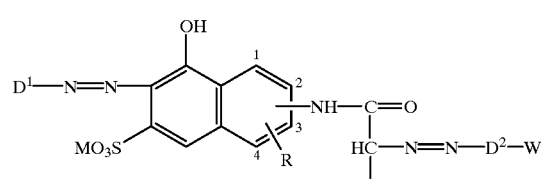

(in which M has the meaning given in the description and is preferably an alkali metal) are written in the following Tabular Examples with the aid of the components corresponding to the formula radicals of formula (1A). They can be prepared in the procedure according to the invention, for example analogously to one of the above Embodiment Examples, from the starting compounds which can be seen from the formula (1A) (such as the diazo components $D^1$—$NH_2$ and $D^2$—$NH_2$ or, where appropriate, $H_2N$—$D^2$—$NH_2$, a sulfoaminonaphthol, diketene and, where appropriate, a halogen-substituted 1,3,5-triazine compound or a halogen-substituted pyrimidine compound). They have very good fiber-reactive dyestuff properties and dye the materials mentioned in the description, such as, in particular, cellulose fiber materials, in the color shade stated in the respective Tabular Example (in this case for cotton) in a high intensity and with good fastness properties.

| Ex. | Radical $D^1$— | Radical R | Position of —NH—CO— | Radical —$D^2$—W | Color shade |
|---|---|---|---|---|---|
| 4 | 2,5-Dimethoxy-4-sulfo-phenyl | 3-Sulfo | 1- | 2,5-Dimethoxy-4-β-sulfatoethyl-sulfonyl)-phenyl | red |
| 5 | 4-Sulfo-2-methoxy-5-methyl-phenyl | 3-Sulfo | 1- | 2-Methoxy-5-methyl-4-(β-sulfatoethyl-sulfonyl)-phenyl | red |
| 6 | 1,5-Disulfo-naphth-2-yl | 3-Sulfo | 1- | 2-Sulfo-4-(β-sulfato-ethyl-sulfonyl)-phenyl | red |
| 7 | 1,5-Disulfo-naphth-2-yl | 3-Sulfo | 1- | 2-Sulfo-5-(2',4'-difluoro-pyrimidin-6'-yl)-amino- | red |

-continued

| Ex. | Radical D¹— | Radical R | Position of —NH—CO— | Radical —D²—W | Color shade |
|---|---|---|---|---|---|
| 8 | 1,5-Disulfo-naphth-2-yl | 3-Sulfo | 1- | phenyl 2-Sulfo-4-(2',4'-difluoro-5'-chloro-pyrimidin-6'-yl)-amino-phenyl | red |
| 9 | 2-Sulfo-phenyl | 3-Sulfo | 1- | 4-{2'-Fluoro-4'-[N-phenyl-N-β-(β'-sulfato-ethylsulfonyl)-ethyl]-amino-1',3',5'-triazin-6'-yl}-amino-2-sulfo-phenyl | red |
| 10 | 2-Sulfo-phenyl | 3-Sulfo | 1- | 4-[2'-Fluoro-4'-(2"-sulfo-phenyl)-amino-1',3',5'-triazin-6'-yl]-amino-2-sulfo-phenyl | red |
| 11 | 2-Sulfo-phenyl | 3-Sulfo | 1- | 2-Sulfo-5-(2',4'-dichloro-1',3',5'-triazin-6'-yl)-amino-phenyl | red |
| 12 | 2-Sulfo-phenyl | 3-Sulfo | 1- | 2-Sulfo-4-[2'-chloro-4'-(3"-vinyl-sulfonyl-phenyl)-amino-1',3',5'-triazin-6'-yl]-phenyl | red |
| 13 | 2,5-Disulfo-phenyl | 3-Sulfo | 1- | 3[β-(Vinyl-sulfonyl)-ethyl]-aminocarbonyl-phenyl | red |
| 14 | 2-Methoxy-4-sulfo-phenyl | Hydrogen | 3- | 2-Hydroxy-4-(β-sulfato-ethylsulfonyl)-phenyl | orange |
| 15 | 2-Methoxy-5-methyl-4-sulfo-phenyl | Hydrogen | 3- | 2-Methoxy-5-methyl-4-(β-sulfatoethyl-sulfonyl)-phenyl | scarlet |
| 16 | 2-Methoxy-5-methyl-4-sulfo-phenyl | Hydrogen | 3- | 2-Sulfo-4-(β-sulfatoethyl-sulfonyl)-phenyl | orange |
| 17 | 2-Sulfo-4-methyl-phenyl | Hydrogen | 3- | 2-Sulfo-4-(2',4'-difluoro-pyrimidin-6'-yl)-amino-phenyl | orange |
| 18 | 2-Sulfo-4-methyl-phenyl | Hydrogen | 3- | 2-Sulfo-4-(2'-fluoro-4'-morpholino-1',3',5'-triazin-6'-yl)-amino-phenyl | orange |
| 19 | 2-Sulfo-4-methoxy-phenyl | 3-Sulfo | 2- | 2-Sulfo-4-{2'-fluoro-4'-[N-phenyl-N-β-(β'-sulfato-ethylsulfonyl)-ethyl]-amino-1',3',5'-triazin-6'-yl}-amino-phenyl | orange |
| 20 | 2-Sulfo-4-methoxy-phenyl | 3-Sulfo | 2- | 2-Sulfo-4-(β-sulfato-ethylsulfonyl)-phenyl | orange |
| 21 | 2-Sulfo-4-methoxy-phenyl | 3-Sulfo | 2- | 2-Sulfo-5-(2',4'-dichloro-1',3',5'-triazin-6'-yl)-amino-phenyl | red |
| 22 | 4-Sulfo-2-cyano-phenyl | 4-Sulfo | 3- | 2-Sulfo-4-{2'-chloro-4'-[N-phenyl-N-(β-vinyl-sulfonyl-ethyl)-amino]-1',3',5'-triazin-6'-yl}-amino-phenyl | orange |
| 23 | 2-Methoxy-5-methyl-4-sulfo-phenyl | 4-Sulfo | 3- | 3-(3'-Vinyl-sulfonyl-phenyl-amino-carbonyl-phenyl | orange |
| 24 | 2-Methoxy-5-methyl-4-sulfo-phenyl | 4-Sulfo | 3- | 2-Sulfo-5[2'-fluoro-4'-(β-sulfoethyl)-amino-1',3',5'-triazin-6'-yl]-amino-phenyl | orange |

What is claimed is:

1. Disazo compound corresponding to the formula (I)

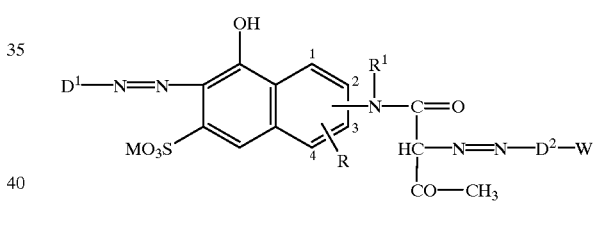

(1)

in which

M is hydrogen or an alkali metal;

R is hydrogen or sulfo bonded in the 2- or 3- or 4-position of the 6-sulfo-8-naphthol radical;

$R^1$ is hydrogen or alkyl having 1 to 6 carbon atoms optionally substituted, or is phenyl, unsubstituted or substituted;

$D^1$ is phenyl or naphthyl, each optionally substituted by 1, 2 or 3 substituents selected from the group consisting of: fluorine, chlorine, cyano, alkyl having 1 to 4 carbon atoms, alkoxy having 1 to 4 carbon atoms, sulfo, carboxy, amino, alkylamino having 1 to 4 carbon atoms, sulfamoyl, carbamoyl, alkylsulfonyl having 1 to 4 carbon atoms, alkanoyl having 2 to 5 carbon atoms, alkanoylamino having 2 to 5 carbon atoms, benzoyl, benzoylamino, sulfobenzoylamino, methylbenzoylamino, a group of the formula (a) and a group of the formula (b)

—CO—O—$R^2$   (a)

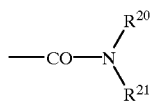
(b)

in which

- $R^2$ is alkyl having 1 to 4 carbon atoms, phenyl or phenyl which is substituted by substituents selected from methyl, ethyl, methoxy, ethoxy, chlorine, sulfo and carboxy,
- $R^{20}$ is hydrogen or alkyl having 1 to 4 carbon atoms optionally substituted by hydroxy, sulfato, phosphate, acetyloxy, propionyloxy, sulfo, carboxy or alkoxy having 1 to 4 carbon atoms, and
- $R^{21}$ is alkyl having 1 to 4 carbon atoms optionally substituted by hydroxy, sulfato, phosphate, acetyloxy, propionyloxy, sulfo, carboxy or phenyl, or is phenyl optionally substituted by 1 or 2 substituents selected from the group consisting of alkyl having 1 to 4 carbon atoms, alkoxy having 1 to 4 carbon atoms, chlorine, sulfo and carboxy;
- $D^2$ is phenylene or naphthylene, each optionally substituted by 1, 2 or 3 substituents selected from the group consisting of: fluorine, chlorine, cyano, nitro, alkyl having 1 to 4 carbon atoms, alkoxy having 1 to 4 carbon atoms, sulfo, carboxy, amino, hydroxy, alkylamino having 1 to 4 carbon atoms, sulfamoyl, carbamoyl, alkylsulfonyl having 1 to 4 carbon atoms, alkanoyl having 2 to 5 carbon atoms, alkanoylamino having 2 to 5 carbon atoms, benzoyl, benzoylamino, sulfobenzoylamino, methylbenzoylamino, a group of the formula (a) and a group of the formula (b) mentioned and defined above;
- W is a group of the formula —SO$_2$—Y or a group of the formula (2), (3), (4), (5) or (6)

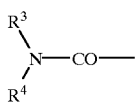
(2)

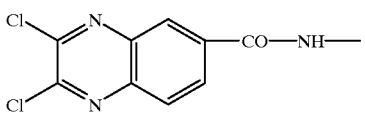
(3)

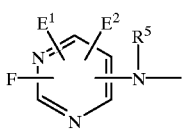
(4)

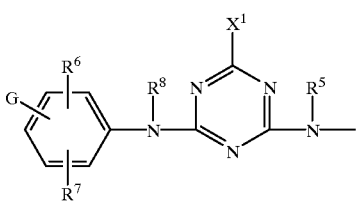
(5)

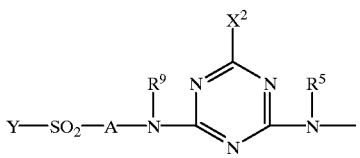
(6)

in which:

- Y is vinyl or is ethyl which is substituted in the β position by a substituent which is eliminated under the action of an alkaline reacting compound to form the vinyl group:
- $R^3$ is a group of the formula (c)

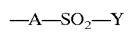
(c)

in which
- Y has one of the abovementioned meanings and
- A is alkylene having 1 to 4 carbon atoms or alkylene having 3 to 6 carbon atoms which is interrupted by 1 or 2 hetero groups from the group consisting of —O— and —NH—, or is phenylene unsubstituted or substituted by 1 or 2 substituents selected from the group consisting of alkoxy having 1 to 4 carbon atoms, alkyl having 1 to 4 carbon atoms, chlorine, sulfo and carboxy, or is naphthylene optionally substituted by 1 or 2 sulfo groups;
- $R^4$ is hydrogen or alkyl having 1 to 4 carbon atoms unsubstituted or substituted by hydroxy, sulfato, phosphato, acetyloxy, propionyloxy, sulfo, carboxy or phenyl, or is phenyl unsubstituted or substituted by 1 or 2 substituents selected from the group consisting of alkyl having 1 to 4 carbon atoms, alkoxy having 1 to 4 carbon atoms, chlorine, sulfo and carboxy, or is an abovementioned and defined group of the formula (c);
- $E^1$ is hydrogen or fluorine;
- $E^2$ is hydrogen, chlorine or fluorine;
- $R^5$ is hydrogen or alkyl having 1 to 4 carbon atoms;
- $R^6$ is alkyl having 1 to 4 carbon atoms, alkoxy having 1 to 4 carbon atoms, sulfamoyl, carbamoyl, alkanoylamino having 2 to 5 carbon atoms or alkylamino having 1 to 4 carbon atoms;
- $R^7$ has one of the meanings of $R^6$;
- $R^8$ is hydrogen or alkyl having 1 to 4 carbon atoms;
- $R^9$ is hydrogen, alkyl having 1 to 4 carbon atoms or is phenyl or phenyl which is substituted by 1 or 2 substituents selected from the group consisting of chlorine, methyl, ethyl, methoxy, ethoxy, sulfo and carboxy;
- $X^1$ is fluorine, chlorine, hydroxy, amino, cyanoamino, alkoxy having 1 to 6 carbon atoms, which can optionally be substituted, or is a group of the formula —NR$^{10}$R$^{11}$, in which R$^{10}$ is hydrogen or alkyl having 1 to 6 carbon atoms and R$^{11}$ has one of the meanings of R$^{10}$ or is phenyl or substituted phenyl, or the group —NR$^{10}$R$^{11}$ is the radical of a 5- or 6-membered saturated heterocyclic ring, the alkylene radical of which optionally being interrupted by a hetero group;
- $X^2$ has one of the meanings of $X^1$;
- G is hydrogen or a group of the formula —SO$_2$—Y, where Y has one of the abovementioned meanings;
- the amino group —N(R$^1$)— bonded to the acetoacetyl grouping is bonded to the 6-sulfo-8-naphthol radical in the 1-, 2- or 3-position.

2. A disazo compound as claimed in claim 1, in which $D^1$ is phenyl which is substituted by 1, 2 or 3 substituents selected from the group consisting of alkyl having 1 to 4 carbon atoms, alkoxy having 1 to 4 carbon atoms, chlorine, sulfo and carboxy, or is naphthyl substituted by 1, 2 or 3 sulfo groups.

3. A disazo compound as claimed in claim 1, in which $D^1$ is phenyl which is substituted by 1 or 2 substituents selected from the group consisting of alkyl having 1 to 4 carbon atoms, alkoxy having 1 to 4 carbon atoms, chlorine, sulfo and carboxy, or is naphthyl substituted by 1 or 2 sulfo groups.

4. A disazo compound as claimed claim 1, in which W is a group of the formula $—SO_2—Y$ in which Y is vinyl or is ethyl which is substituted in the β-position by a substituent which is eliminated under the action of an alkaline reacting compound to form the vinyl group.

5. A disazo compound as claimed in claim 1, in which W is a group of the formula (4)

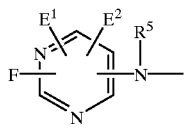

(4)

in which $E^1$ is hydrogen or fluorine, $E^2$ is hydrogen, chlorine or fluorine and $R^5$ is hydrogen, methyl or ethyl.

6. A disazo compound as claimed in claim 1, in which W is a group of the formula (5)

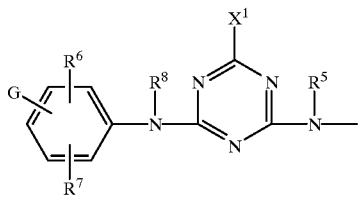

(5)

in which $X^1$ is fluorine, chlorine or cyanoamino, $R^5$ is hydrogen, methyl or ethyl, $R^6$ is hydrogen, methyl, ethyl, methoxy, ethoxy, sulfo or carboxy, $R^7$ is hydrogen, methyl, ethyl, methoxy, ethoxy, sulfo or carboxy, $R^8$ is hydrogen, methyl or ethyl and G is hydrogen or a group of the formula $—SO_2—Y$, in which Y is vinyl or is ethyl which is substituted in the β-position by a substituent which is eliminated under the action of an alkaline reacting compound to form the vinyl group.

7. A disazo compound as claimed in claim 1, in which W is a group of the formula (6)

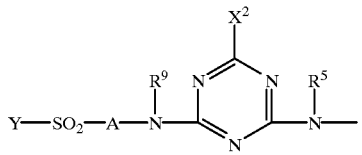

(6)

in which $X^2$ is chlorine, fluorine or cyanoamino, $R^5$ is hydrogen, methyl or ethyl, $R^9$ is hydrogen, methyl or ethyl, A is n-ethylene or n-propylene, or is alkylene having 3 to 6 carbon atoms which is interrupted by 1 or 2 hetero groups from the group consisting of —O— and —NH—, or is phenylene unsubstituted or substituted by 1 or 2 substituents selected from the group consisting of ethoxy, methoxy, ethyl, methyl, chlorine, sulfo and carboxy, or is naphthylene which is substituted by 1 or 2 sulfo groups, and Y is vinyl or is ethyl which is substituted in the β-position by a substituent which is eliminated under the action of an alkaline reacting compound to form the vinyl group.

8. A disazo compound as claimed in claim 1, in which $D^2$ is phenylene unsubstituted or substituted by 1 or 2 substituents selected from the group consisting of alkyl having 1 to 4 carbon atoms, alkoxy having 1 to 4 carbon atoms, chlorine, sulfo and carboxy, or is naphthylene which is substituted by 1 or 2 sulfo groups.

9. A disazo compound as claimed in claim 1, in which $R^1$ is hydrogen.

10. A disazo compound as claimed in claims 1, in which Y is vinyl or is ethyl which is substituted in the β-position by chlorine, sulfato, thiosulfato, phosphato or acetyloxy.

11. A disazo compound as claimed in claim 1, in which Y is vinyl or β-sulfatoethyl.

12. A process for the preparation of a compound of the formula (1) mentioned and defined in claim 1, which comprises coupling a diazonium salt compound of an amine of the formula $D^1—NH_2$ in which $D^1$ is defined as in claim 1, with a compound of the formula (7)

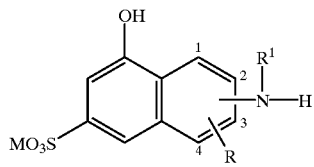

(7)

in which M, R and $R^1$ have the meanings given in claim 1, R is bonded in the 2-, 3- or 4-position of the 6-sulfo-8-naphthol radical and the amino group $—N(R^1)H$ is bonded to the 6-sulfo-8-naphthol radical in the 1-, 2- or 3-position, reacting the azo compound thus prepared with diketene at a temperature of 20 to 70° C. and a pH of 4 to 11 to give the compound of the formula (8)

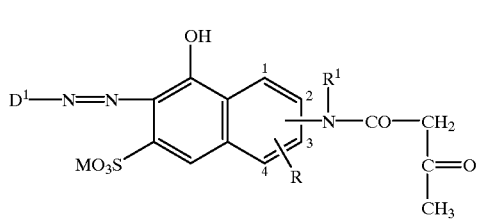

(8)

in which the individual members of the formula have the meanings given in claim 1, and then coupling it with a diazonium salt compound of an amine of the formula $H_2N—D^2—W$ where $D^2$ and W have the abovementioned meaning, to give the compound of the formula (1), or reacting a compound of the formula (7) with diketene at a temperature of 20 to 60° C. and a pH of 4 to 11 and coupling the acetoacetylamino-mono- or -disulfo-naphthol compound obtained with the diazonium salt of an amine of the formula $D^1—NH_2$, where $D^1$ has the meaning given in claim 1, and with a second diazonium salt of an amine of the formula $H_2N—D^2—W$, where D and W have the meaning given in claim 1, at a pH of between 4 and 7 and at a temperature between 5 and 20° C.

13. A process for dyeing fibers which comprises applying a dyestuff comprising the diazo compound as claimed in claim 1 to a fiber material and the dyestuff is fixed on the material by means of
(A) heat,
(B) by means of an alkaline agent or
(C) by means of heat and an alkaline agent.

14. A disazo compound corresponding to the formula (I)

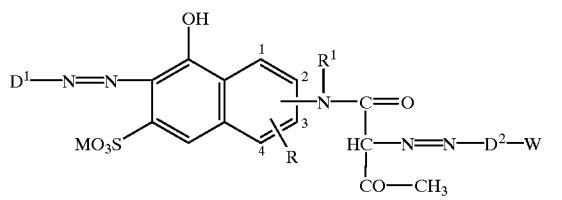

(1)

in which

M is hydrogen or an alkali metal;

R is hydrogen or sulfo bonded in the 2- or 3- or 4-position of the 6-sulfo-8-naphthol radical;

$R^1$ is hydrogen or alkyl having 1 to 6 carbon atoms optionally substituted, or is phenyl, unsubstituted or substituted;

$D^1$ is phenyl or naphthyl, each optionally substituted by 1, 2 or 3 substituents selected from the group consisting of: fluorine, chlorine, cyano, nitro, alkyl having 1 to 4 carbon atoms, alkoxy having 1 to 4 carbon atoms, sulfo, carboxy, amino, hydroxy, alkylamino having 1 to 4 carbon atoms, sulfamoyl, carbamoyl, alkylsulfonyl having 1 to 4 carbon atoms, alkanoyl having 2 to 5 carbon atoms, alkanoylamino having 2 to 5 carbon atoms, benzoyl, benzoylamino, sulfobenzoylamino, methylbenzoylamino, a group of the formula (a) and a group of the formula (b)

—CO—O—$R^2$  (a)

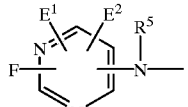

(b)

in which $R^2$ is alkyl having 1 to 4 carbon atoms, phenyl or phenyl which is substituted by substituents selected from methyl, ethyl, methoxy, ethoxy, chlorine, sulfo and carboxy, $R^{20}$ is hydrogen or alkyl having 1 to 4 carbon atoms optionally substituted by hydroxy, sulfato, phosphato, acetyloxy, propionyloxy, sulfo, carboxy or alkoxy having 1 to 4 carbon atoms, and $R^{21}$ is alkyl having 1 to 4 carbon atoms optionally substituted by hydroxy, sulfato, phosphate, acetyloxy, propionyloxy, sulfo, carboxy or phenyl, or is phenyl optionally substituted by 1 or 2 substituents selected from the group consisting of alkyl having 1 to 4 carbon atoms, alkoxy having 1 to 4 carbon atoms, chlorine, sulfo and carboxy;

$D^2$ is phenylene or naphthylene, each optionally substituted by 1, 2 or 3 substituents selected from the group consisting of: fluorine, chlorine, cyano, nitro, alkyl having 1 to 4 carbon atoms, alkoxy having 1 to 4 carbon atoms, sulfo, carboxy, amino, hydroxy, alkylamino having 1 to 4 carbon atoms, sulfamoyl, carbamoyl, alkylsulfonyl having 1 to 4 carbon atoms, alkanoyl having 2 to 5 carbon atoms, alkanoylamino having 2 to 5 carbon atoms, benzoyl, benzoylamino, sulfobenzoylamino, methylbenzoylamino, a group of the formula (a) and a group of the formula (b) mentioned and defined above;

W is a group of the formula (4)

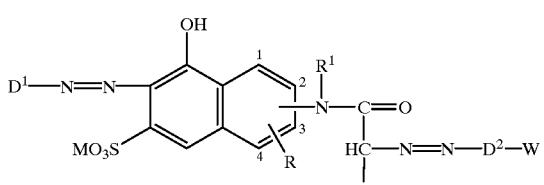

(4)

in which $E^1$ is hydrogen or fluorine, $E^2$ is hydrogen, chlorine or fluorine and $R^5$ is hydrogen or alkyl having 1 to 4 carbon atoms;

the amino group —N($R^1$)— bonded to the acetoacetyl grouping is bonded to the 6-sulfo-8-naphthol radical in the 1-, 2- or 3-position.

15. A disazo compound corresponding to the formula (I)

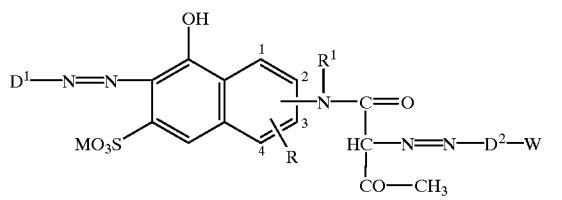

(1)

in which

M is hydrogen or an alkali metal;

R is hydrogen or sulfo bonded in the 2- or 3- or 4-position of the 6-sulfo-8-naphthol radical;

$R^1$ is hydrogen or alkyl having 1 to 6 carbon atoms optionally substituted, or is phenyl, unsubstituted or substituted;

$D^1$ is phenyl or naphthyl, each optionally substituted by 1, 2 or 3 substituents selected from the group consisting of: fluorine, chlorine, cyano, nitro, alkyl having 1 to 4 carbon atoms, alkoxy having 1 to 4 carbon atoms, sulfo, carboxy, amino, hydroxy, alkylamino having 1 to 4 carbon atoms, sulfamoyl, carbamoyl, alkylsulfonyl having 1 to 4 carbon atoms, alkanoyl having 2 to 5 carbon atoms, alkanoylamino having 2 to 5 carbon atoms, benzoyl, benzoylamino, sulfobenzoylamino, methylbenzoylamino, a group of the formula (a) and a group of the formula (b)

—CO—O—$R^2$  (a)

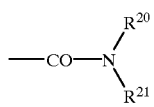

in which

R² is alkyl having 1 to 4 carbon atoms, phenyl or phenyl which is substituted by substituents selected from methyl, ethyl, methoxy, ethoxy, chlorine, sulfo and carboxy, R²⁰ is hydrogen or alkyl having 1 to 4 carbon atoms optionally substituted by hydroxy, sulfato, phosphato, acetyloxy, propionyloxy, sulfo, carboxy or alkoxy having 1 to 4 carbon atoms, and R²¹ is alkyl having 1 to 4 carbon atoms optionally substituted by hydroxy, sulfato, phosphato, acetyloxy, propionyloxy, sulfo, carboxy or phenyl, or is phenyl optionally substituted by 1 or 2 substituents selected from the group consisting of alkyl having 1 to 4 carbon atoms, alkoxy having 1 to 4 carbon atoms, chlorine, sulfo and carboxy;

D² is phenylene or naphthylene, each optionally substituted by 1, 2 or 3 substituents selected from the group consisting of: fluorine, chlorine, cyano, nitro, alkyl having 1 to 4 carbon atoms, alkoxy having 1 to 4 carbon atoms, sulfo, carboxy, amino, hydroxy, alkylamino having 1 to 4 carbon atoms, sulfamoyl, carbamoyl, alkylsulfonyl having 1 to 4 carbon atoms, alkanoyl having 2 to 5 carbon atoms, alkanoylamino having 2 to 5 carbon atoms, benzoyl, benzoylamino, sulfobenzoylamino, methylbenzoylamino, a group of the formula (a) and a group of the formula (b) mentioned and defined above;

W is a group of the formula (5)

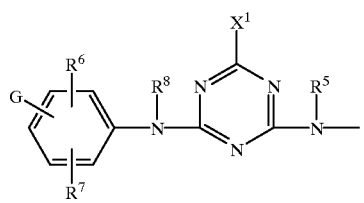

in which:

R⁵ is hydrogen or alkyl having 1 to 4 carbon atoms;

R⁶ is alkyl having 1 to 4 carbon atoms, alkoxy having 1 to 4 carbon atoms, sulfamoyl, carbamoyl, alkanoylamino having 2 to 5 carbon atoms or alkylamino having 1 to 4 carbon atoms;

R⁷ has one of the meanings of R⁶;

R⁸ is hydrogen or alkyl having 1 to 4 carbon atoms;

X¹ is fluorine, chlorine, hydroxy, amino, cyanoamino, alkoxy having 1 to 6 carbon atoms, which can optionally be substituted, or is a group of the formula —NR¹⁰R¹¹, in which R¹⁰ is hydrogen or alkyl having 1 to 6 carbon atoms and R¹¹ has one of the meanings of R¹⁰ or is phenyl or substituted phenyl, or the group —NR¹⁰R¹¹ is the radical of a 5- or 6-membered saturated heterocyclic ring, the alkylene radical of which optionally being interrupted by a hetero group;

X² has one of the meanings of X¹;

G is hydrogen or a group of the formula —SO₂—Y, and where

Y is vinyl or is ethyl which is substituted in the β position by a substituent which is eliminated under the action of an alkaline reacting compound to form the vinyl group: and the amino group —N(R¹)— bonded to the acetoacetyl grouping is bonded to the 6-sulfo-8-naphthol radical in the 1-, 2- or 3-position.

16. A disazo compound corresponding to the formula (I)

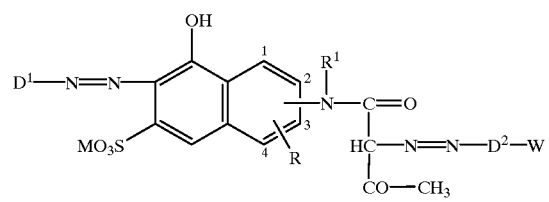

in which

M is hydrogen or an alkali metal;

R is hydrogen or sulfo bonded in the 2- or 3- or 4-position of the 6-sulfo-8-naphthol radical;

R¹ is hydrogen or alkyl having 1 to 6 carbon atoms optionally substituted, or is phenyl, unsubstituted or substituted;

D¹ is phenyl or naphthyl, each optionally substituted by 1, 2 or 3 substituents selected from the group consisting of: fluorine, chlorine, cyano, nitro, alkyl having 1 to 4 carbon atoms, alkoxy having 1 to 4 carbon atoms, sulfo, carboxy, amino, hydroxy, alkylamino having 1 to 4 carbon atoms, sulfamoyl, carbamoyl, alkylsulfonyl having 1 to 4 carbon atoms, alkanoyl having 2 to 5 carbon atoms, alkanoylamino having 2 to 5 carbon atoms, benzoyl, benzoylamino, sulfobenzoylamino, methylbenzoylamino, a group of the formula (a) and a group of the formula (b)

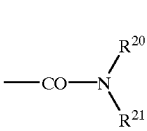

in which

R² is alkyl having 1 to 4 carbon atoms, phenyl or phenyl which is substituted by substituents selected from methyl, ethyl, methoxy, ethoxy, chlorine, sulfo and carboxy, R²⁰ is hydrogen or alkyl having 1 to 4 carbon atoms optionally substituted by hydroxy, sulfato, phosphate, acetyloxy, propionyloxy, sulfo, carboxy or alkoxy having 1 to 4 carbon atoms, and R²¹ is alkyl having 1 to 4 carbon atoms optionally substituted by hydroxy, sulfato, phosphate, acetyloxy, propionyloxy, sulfo, carboxy or phenyl, or is phenyl optionally substituted by 1 or 2 substituents selected from the group consisting of alkyl having 1 to 4 carbon atoms, alkoxy having 1 to 4 carbon atoms, chlorine, sulfo and carboxy;

D² is phenylene or naphthylene, each optionally substituted by 1, 2 or 3 substituents selected from the group consisting of: fluorine, chlorine, cyano, nitro, alkyl having 1 to 4 carbon atoms, alkoxy having 1 to 4 carbon atoms, sulfo, carboxy, amino, hydroxy, alkylamino having 1 to 4 carbon atoms, sulfamoyl, carbamoyl, alkylsulfonyl having 1 to 4 carbon atoms, alkanoyl having 2 to 5 carbon atoms, alkanoylamino having 2 to 5 carbon atoms, benzoyl, benzoylamino, sulfobenzoylamino, methylbenzoylamino, a group of the formula (a) and a group of the formula (b) mentioned and defined above;

W is a group of the formula (6)

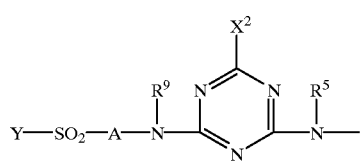

(6)

in which
  Y is vinyl or is ethyl which is substituted in the β position by a substituent which is eliminated under the action of an alkaline reacting compound to form the vinyl group:
  A is alkylene having 1 to 4 carbon atoms or alkylene having 3 to 6 carbon atoms which is interrupted by 1 or 2 hetero groups from the group consisting of —O— and —NH—, or is phenylene unsubstituted or substituted by 1 or 2 substituents selected from the group consisting of alkoxy having 1 to 4 carbon atoms, alkyl having 1 to 4 carbon atoms, chlorine, sulfo and carboxy, or is naphthylene optionally substituted by 1 or 2 sulfo groups;
  $R^5$ is hydrogen or alkyl having 1 to 4 carbon atoms;
  $R^9$ is hydrogen, alkyl having 1 to 4 carbon atoms or is phenyl or phenyl which is substituted by 1 or 2 substituents selected from the group consisting of chlorine, methyl, ethyl, methoxy, ethoxy, sulfo and carboxy;
  $X^2$ is fluorine, chlorine, hydroxy, amino, cyanoamino, alkoxy having 1 to 6 carbon atoms, which can optionally be substituted, or is a group of the formula —$NR^{10}R^{11}$, in which $R^{10}$ is hydrogen or alkyl having 1 to 6 carbon atoms and $R^{11}$ has one of the meanings of $R^{10}$ or is phenyl or substituted phenyl, or the group —$NR^{10}R^{11}$ is the radical of a 5- or 6-membered saturated heterocyclic ring, the alkylene radical of which optionally being interrupted by a hetero group; and
the amino group —$N(R^1)$— bonded to the acetoacetyl grouping is bonded to the 6-sulfo-8-naphthol radical in the 1-, 2- or 3-position.

17. A disazo compound corresponding to the formula (I)

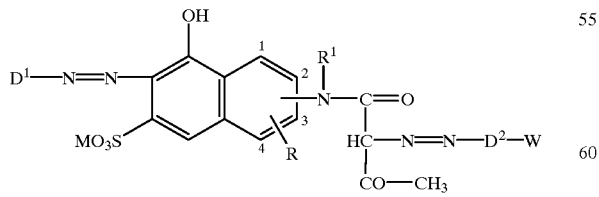

(1)

in which
  M is hydrogen or an alkali metal;
  R is hydrogen or sulfo bonded in the 2- or 3- or 4-position of the 6-sulfo-8-naphthol radical;

$R^1$ is hydrogen or alkyl having 1 to 6 carbon atoms optionally substituted, or is phenyl, unsubstituted or substituted;

$D^1$ is phenyl or naphthyl, each optionally substituted by 1, 2 or 3 substituents selected from the group consisting of: fluorine, chlorine, cyano, nitro, alkyl having 1 to 4 carbon atoms, alkoxy having 1 to 4 carbon atoms, sulfo, carboxy, amino, hydroxy, alkylamino having 1 to 4 carbon atoms, sulfamoyl, carbamoyl, alkylsulfonyl having 1 to 4 carbon atoms, alkanoyl having 2 to 5 carbon atoms, alkanoylamino having 2 to 5 carbon atoms, benzoyl, benzoylamino, sulfobenzoylamino, methylbenzoylamino, a group of the formula (a) and a group of the formula (b)

—CO—O $R^2$ (a)

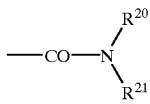

(b)

in which
  $R^2$ is alkyl having 1 to 4 carbon atoms, phenyl or phenyl which is substituted by substituents selected from methyl, ethyl, methoxy, ethoxy, chlorine, sulfo and carboxy,
  $R^{20}$ is hydrogen or alkyl having 1 to 4 carbon atoms optionally substituted by hydroxy, sulfato, phosphate, acetyloxy, propionyloxy, sulfo, carboxy or alkoxy having 1 to 4 carbon atoms, and
  $R^{21}$ is alkyl having 1 to 4 carbon atoms optionally substituted by hydroxy, sulfato, phosphate, acetyloxy, propionyloxy, sulfo, carboxy or phenyl, or is phenyl optionally substituted by 1 or 2 substituents selected from the group consisting of alkyl having 1 to 4 carbon atoms, alkoxy having 1 to 4 carbon atoms, chlorine, sulfo and carboxy;
  $D^2$ is phenylene unsubstituted or substituted by 1 or 2 substituents selected from the group consisting of alkyl having 1 to 4 carbon atoms, alkoxy having 1 to 4 carbon atoms, chlorine, sulfo and carboxy, or is naphthylene which is substituted by 1 or 2 sulfo groups;
  W is a group of the formula —$SO_2$—Y or a group of the formula (2), (3), (4), (5) or (6)

(2)

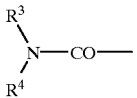

(3)

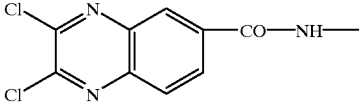

(4)

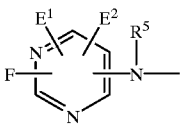

-continued

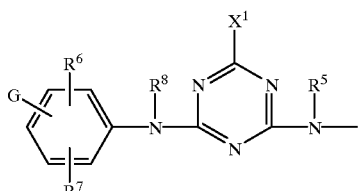

(5)

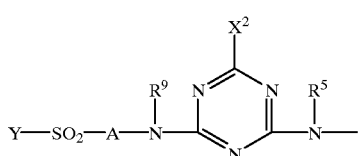

(6)

in which:

Y is vinyl or is ethyl which is substituted in the β position by a substituent which is eliminated under the action of an alkaline reacting compound to form the vinyl group:

$R^3$ is a group of the formula (c)

—A—SO$_2$—Y          (c)

in which

Y has one of the abovementioned meanings and

A is alkylene having 1 to 4 carbon atoms or alkylene having 3 to 6 carbon atoms which is interrupted by 1 or 2 hetero groups from the group consisting of —O— and —NH—, or is phenylene unsubstituted or substituted by 1 or 2 substituents selected from the group consisting of alkoxy having 1 to 4 carbon atoms, alkyl having 1 to 4 carbon atoms, chlorine, sulfo and carboxy, or is naphthylene optionally substituted by 1 or 2 sulfo groups;

$R^4$ is hydrogen or alkyl having 1 to 4 carbon atoms unsubstituted or substituted by hydroxy, sulfato, phosphato, acetyloxy, propionyloxy, sulfo, carboxy or phenyl, or is phenyl unsubstituted or substituted by 1 or 2 substituents selected from the group consisting of alkyl having 1 to 4 carbon atoms, alkoxy having 1 to 4 carbon atoms, chlorine, sulfo and carboxy, or is an abovementioned and defined group of the formula (c);

$E^1$ is hydrogen or fluorine;

$E^2$ is hydrogen, chlorine or fluorine;

$R^5$ is hydrogen or alkyl having 1 to 4 carbon atoms;

$R^6$ is alkyl having 1 to 4 carbon atoms, alkoxy having 1 to 4 carbon atoms, sulfamoyl, carbamoyl, alkanoylamino having 2 to 5 carbon atoms or alkylamino having 1 to 4 carbon atoms;

$R^7$ has one of the meanings of $R^6$;

$R^8$ is hydrogen or alkyl having 1 to 4 carbon atoms;

$R^9$ is hydrogen, alkyl having 1 to 4 carbon atoms or is phenyl or phenyl which is substituted by 1 or 2 substituents selected from the group consisting of chlorine, methyl, ethyl, methoxy, ethoxy, sulfo and carboxy;

$X^1$ is fluorine, chlorine, hydroxy, amino, cyanoamino, alkoxy having 1 to 6 carbon atoms, which can optionally be substituted, or is a group of the formula —NR$^{10}$R$^{11}$, in which $R^{10}$ is hydrogen or alkyl having 1 to 6 carbon atoms and $R^{11}$ has one of the meanings of $R^{10}$ or is phenyl or substituted phenyl, or the group —NR$^{10}$R$^{11}$ is the radical of a 5- or 6-membered saturated heterocyclic ring, the alkylene radical of which optionally being interrupted by a hetero group;

$X^2$ has one of the meanings of $X^1$;

G is hydrogen or a group of the formula —SO$_2$—Y, where Y has one of the abovementioned meanings;

the amino group —N(R$^1$)— bonded to the acetoacetyl grouping is bonded to the 6-sulfo-8-naphthol radical in the 1-, 2- or 3-position.

18. A process for the preparation of a compound of the formula (I)

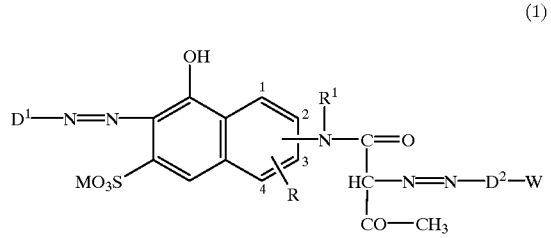

(1)

in which

M is hydrogen or an alkali metal;

R is hydrogen or sulfo bonded in the 2- or 3- or 4-position of the 6-sulfo-8-naphthol radical;

$R^1$ is hydrogen or alkyl having 1 to 6 carbon atoms optionally substituted, or is phenyl, unsubstituted or substituted;

$D^1$ is phenyl or naphthyl, each optionally substituted by 1, 2 or 3 substituents selected from the group consisting of: fluorine, chlorine, cyano, nitro, alkyl having 1 to 4 carbon atoms, alkoxy having 1 to 4 carbon atoms, sulfo, carboxy, amino, hydroxy, alkylamino having 1 to 4 carbon atoms, sulfamoyl, carbamoyl, alkylsulfonyl having 1 to 4 carbon atoms, alkanoyl having 2 to 5 carbon atoms, alkanoylamino having 2 to 5 carbon atoms, benzoyl, benzoylamino, sulfobenzoylamino, methylbenzoylamino, a group of the formula (a) and a group of the formula (b)

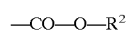

—CO—O—R$^2$          (a)

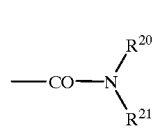

(b)

in which $R^2$ is alkyl having 1 to 4 carbon atoms, phenyl or phenyl which is substituted by substituents selected from methyl, ethyl, methoxy, ethoxy, chlorine, sulfo and carboxy, $R^{20}$ is hydrogen or alkyl having 1 to 4 carbon atoms optionally substituted by hydroxy, sulfato, phosphate, acetyloxy, propionyloxy, sulfo, carboxy or alkoxy having 1 to 4 carbon atoms, and $R^{21}$ is alkyl having 1 to 4 carbon atoms optionally substituted by hydroxy, sulfato, phosphate, acetyloxy, propionyloxy, sulfo, carboxy or phenyl, or is phenyl optionally substituted by 1 or 2 substituents selected from the group consisting of alkyl having 1 to 4 carbon atoms, alkoxy having 1 to 4 carbon atoms, chlorine, sulfo and carboxy;

D² is phenylene or naphthylene, each optionally substituted by 1, 2 or 3 substituents selected from the group consisting of: fluorine, chlorine, cyano, nitro, alkyl having 1 to 4 carbon atoms, alkoxy having 1 to 4 carbon atoms, sulfo, carboxy, amino, hydroxy, alkylamino having 1 to 4 carbon atoms, sulfamoyl, carbamoyl, alkylsulfonyl having 1 to 4 carbon atoms, alkanoyl having 2 to 5 carbon atoms, alkanoylamino having 2 to 5 carbon atoms, benzoyl, benzoylamino, sulfobenzoylamino, methylbenzoylamino, a group of the formula (a) and a group of the formula (b) mentioned and defined above;

W is a group of the formula $-SO_2-Y$ or a group of the formula (2), (3), (4), (5) or (6)

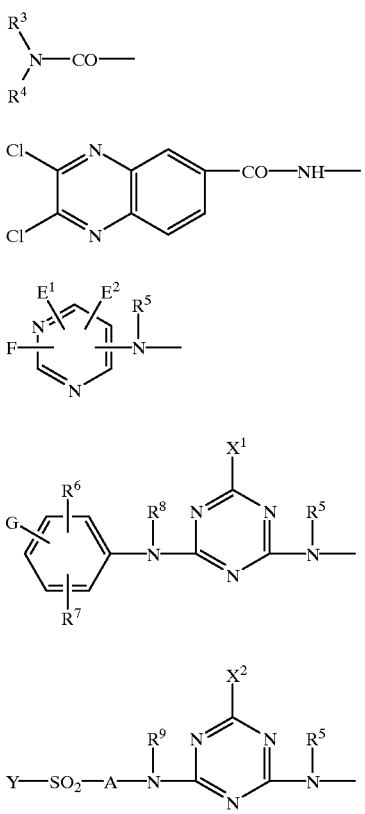

in which:

Y is vinyl or is ethyl which is substituted in the β position by a substituent which is eliminated under the action of an alkaline reacting compound to form the vinyl group:

R³ is a group of the formula (c)

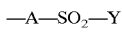 $-A-SO_2-Y$ (c)

in which

Y has one of the abovementioned meanings and

A is alkylene having 1 to 4 carbon atoms or alkylene having 3 to 6 carbon atoms which is interrupted by 1 or 2 hetero groups from the group consisting of $-O-$ and $-NH-$, or is phenylene unsubstituted or substituted by 1 or 2 substituents selected from the group consisting of alkoxy having 1 to 4 carbon atoms, alkyl having 1 to 4 carbon atoms, chlorine, sulfo and carboxy, or is naphthylene optionally substituted by 1 or 2 sulfo groups;

R⁴ is hydrogen or alkyl having 1 to 4 carbon atoms unsubstituted or substituted by hydroxy, sulfato, phosphato, acetyloxy, propionyloxy, sulfo, carboxy or phenyl, or is phenyl unsubstituted or substituted by 1 or 2 substituents selected from the group consisting of alkyl having 1 to 4 carbon atoms, alkoxy having 1 to 4 carbon atoms, chlorine, sulfo and carboxy, or is an abovementioned and defined group of the formula (c);

$E^1$ is hydrogen or fluorine;

$E^2$ is hydrogen, chlorine or fluorine;

$R^5$ is hydrogen or alkyl having 1 to 4 carbon atoms;

$R^6$ is alkyl having 1 to 4 carbon atoms, alkoxy having 1 to 4 carbon atoms, sulfamoyl, carbamoyl, alkanoylamino having 2 to 5 carbon atoms or alkylamino having 1 to 4 carbon atoms;

$R^7$ has one of the meanings of $R^6$;

$R^8$ is hydrogen or alkyl having 1 to 4 carbon atoms;

$R^9$ is hydrogen, alkyl having 1 to 4 carbon atoms or is phenyl or phenyl which is substituted by 1 or 2 substituents selected from the group consisting of chlorine, methyl, ethyl, methoxy, ethoxy, sulfo and carboxy;

$X^1$ is fluorine, chlorine, hydroxy, amino, cyanoamino, alkoxy having 1 to 6 carbon atoms, which can optionally be substituted, or is a group of the formula $-NR^{10}R^{11}$, in which $R^{10}$ is hydrogen or alkyl having 1 to 6 carbon atoms and $R^{11}$ has one of the meanings of $R^{10}$ or is phenyl or substituted phenyl, or the group $-NR^{10}R^{11}$ is the radical of a 5- or 6-membered saturated heterocyclic ring, the alkylene radical of which optionally being interrupted by a hetero group;

$X^2$ has one of the meanings of $X^1$;

G is hydrogen or a group of the formula $-SO_2-Y$, where Y has one of the abovementioned meanings;

the amino group $-N(R^1)-$ bonded to the acetoacetyl grouping is bonded to the 6-sulfo-8-naphthol radical in the 1-, 2- or 3-position which comprises coupling a diazonium salt compound of an amine of the formula $D^1-NH_2$ in which $D^1$ is defined above, with a compound of the formula (7)

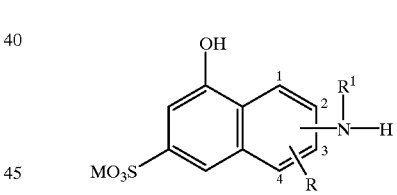

(7)

in which M, R and $R^1$ are defined above, R is bonded in the 2-, 3- or 4-position of the 6-sulfo-8-naphthol radical and the amino group $-N(R^1)H$ is bonded to the 6-sulfo-8-naphthol radical in the 1-, 2- or 3-position, reacting the azo compound thus prepared with diketene at a temperature of 20 to 70° C. and a pH of 4 to 11 to give the compound of the formula (8)

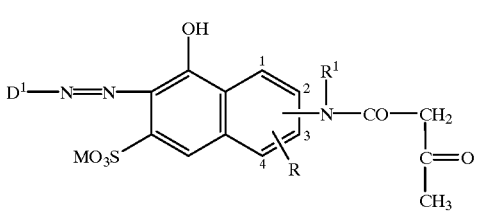

(8)

in which the individual members of the formula have the meanings defined above, and then coupling it with a diazonium salt compound of an amine of the formula $H_2N-$ $D^2$—W where $D^2$ and W have the abovementioned meaning, to give the compound of the formula (1), or reacting a compound of the formula (7) with diketene at a temperature of 20 to 60° C. and a pH of 4 to 11 and coupling the acetoacetylamino-mono- or -disulfo-naphthol compound obtained with the diazonium salt of an amine of the formula $D^1$—$NH_2$, where $D^1$ has the meaning given above, and with a second diazonium salt of an amine of the formula $H_2N$—$D^2$—W, where $D^2$ and W have the meaning given above, at a pH of between 4 and 7 and at a temperature between 5 and 20° C.

19. A process for dyeing fibers which comprises applying a dyestuff comprising the disazo compound

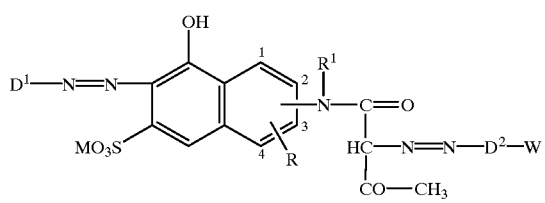
(1)

in which

M is hydrogen or an alkali metal;

R is hydrogen or sulfo bonded in the 2- or 3- or 4-position of the 6-sulfo-8-naphthol radical;

$R^1$ is hydrogen or alkyl having 1 to 6 carbon atoms optionally substituted, or is phenyl, unsubstituted or substituted;

$D^1$ is phenyl or naphthyl, each optionally substituted by 1, 2 or 3 substituents selected from the group consisting of: fluorine, chlorine, cyano, nitro, alkyl having 1 to 4 carbon atoms, alkoxy having 1 to 4 carbon atoms, sulfo, carboxy, amino, hydroxy, alkylamino having 1 to 4 carbon atoms, sulfamoyl, carbamoyl, alkylsulfonyl having 1 to 4 carbon atoms, alkanoyl having 2 to 5 carbon atoms, alkanoylamino having 2 to 5 carbon atoms, benzoyl, benzoylamino, sulfobenzoylamino, methylbenzoylamino, a group of the formula (a) and a group of the formula (b)

—CO—O—$R^2$ (a)

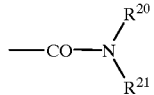
(b)

in which $R^2$ is alkyl having 1 to 4 carbon atoms, phenyl or phenyl which is substituted by substituents selected from methyl, ethyl, methoxy, ethoxy, chlorine, sulfo and carboxy, $R^{20}$ is hydrogen or alkyl having 1 to 4 carbon atoms optionally substituted by hydroxy, sulfato, phosphato, acetyloxy, propionyloxy, sulfo, carboxy or alkoxy having 1 to 4 carbon atoms, and $R^{21}$ is alkyl having 1 to 4 carbon atoms optionally substituted by hydroxy, sulfato, phosphate, acetyloxy, propionyloxy, sulfo, carboxy or phenyl, or is phenyl optionally substituted by 1 or 2 substituents selected from the group consisting of alkyl having 1 to 4 carbon atoms, alkoxy having 1 to 4 carbon atoms, chlorine, sulfo and carboxy;

$D^2$ is phenylene or naphthylene, each optionally substituted by 1, 2 or 3 substituents selected from the group consisting of: fluorine, chlorine, cyano, nitro, alkyl having 1 to 4 carbon atoms, alkoxy having 1 to 4 carbon atoms, sulfo, carboxy, amino, hydroxy, alkylamino having 1 to 4 carbon atoms, sulfamoyl, carbamoyl, alkylsulfonyl having 1 to 4 carbon atoms, alkanoyl having 2 to 5 carbon atoms, alkanoylamino having 2 to 5 carbon atoms, benzoyl, benzoylamino, sulfobenzoylamino, methylbenzoylamino, a group of the formula (a) and a group of the formula (b) mentioned and defined above;

W is a group of the formula —$SO_2$—Y or a group of the formula (2), (3), (4), (5) or (6)

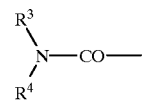
(2)

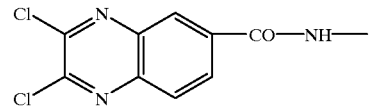
(3)

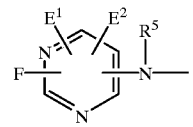
(4)

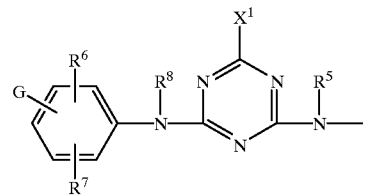
(5)

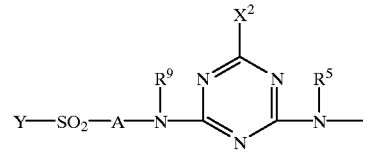
(6)

in which:

Y is vinyl or is ethyl which is substituted in the β position by a substituent which is eliminated under the action of an alkaline reacting compound to form the vinyl group:

$R^3$ is a group of the formula (c)

—A—$SO_2$—Y (c)

in which

Y has one of the abovementioned meanings and

A is alkylene having 1 to 4 carbon atoms or alkylene having 3 to 6 carbon atoms which is interrupted by 1 or 2 hetero groups from the group consisting of —O— and —NH—, or is phenylene unsubstituted or substituted by 1 or 2 substituents selected from the group consisting of alkoxy having 1 to 4 carbon atoms, alkyl having 1 to 4 carbon atoms, chlorine, sulfo and carboxy, or is naphthylene optionally substituted by 1 or 2 sulfo groups; $R^4$ is hydrogen or alkyl having 1 to 4 carbon atoms unsubstituted or substituted by hydroxy, sulfato, phosphato, acetyloxy, propionyloxy, sulfo, carboxy or phenyl, or is phenyl unsubstituted or substituted by 1 or 2 substituents selected from the group consisting of alkyl having 1 to 4 carbon atoms, alkoxy having 1 to 4 carbon atoms, chlorine, sulfo and carboxy, or is an abovementioned and defined group of the formula (c);

$E^1$ is hydrogen or fluorine;

$E^2$ is hydrogen, chlorine or fluorine;

$R^5$ is hydrogen or alkyl having 1 to 4 carbon atoms;

$R^6$ is alkyl having 1 to 4 carbon atoms, alkoxy having 1 to 4 carbon atoms, sulfamoyl, carbamoyl, alkanoylamino having 2 to 5 carbon atoms or alkylamino having 1 to 4 carbon atoms;

$R^7$ has one of the meanings of $R^6$;

$R^8$ is hydrogen or alkyl having 1 to 4 carbon atoms;

$R^9$ is hydrogen, alkyl having 1 to 4 carbon atoms or is phenyl or phenyl which is substituted by 1 or 2 substituents selected from the group consisting of chlorine, methyl, ethyl, methoxy, ethoxy, sulfo and carboxy;

$X^1$ is fluorine, chlorine, hydroxy, amino, cyanoamino, alkoxy having 1 to 6 carbon atoms, which can optionally be substituted, or is a group of the formula —$NR^{10}R^{11}$, in which $R^{10}$ is hydrogen or alkyl having 1 to 6 carbon atoms and $R^{11}$ has one of the meanings of $R^{10}$ or is phenyl or substituted phenyl, or the group —$NR^{10}R^{11}$ is the radical of a 5- or 6-membered saturated heterocyclic ring, the alkylene radical of which optionally being interrupted by a hetero group;

$X^2$ has one of the meanings of $X^1$;

G is hydrogen or a group of the formula —$SO_2$—Y, where Y has one of the abovementioned meanings;

the amino group —$N(R^1)$—bonded to the acetoacetyl grouping is bonded to the 6-sulfo-8-naphthol radical in the 1-, 2- or 3-position, to a fiber material and the dyestuff is fixed on the material by means of (A) heat, (B) by means of an alkaline agent or (C) by means of heat and an alkaline agent.

* * * * *

UNITED STATES PATENT AND TRADEMARK OFFICE
CERTIFICATE OF CORRECTION

PATENT NO. : 6,187,912 B1
DATED : February 13, 2001
INVENTOR(S) : Joachim Steckelberg It is certified that error appears in the above-identified patent and that said Letters Patent is hereby corrected as shown below:

Claim 1, column 15,
Lines 16 and 20, change "phosphate" to -- phosphato -- .

Claim 12, column 18,
Line 65, change "D" to -- $D^2$ --

Claim 14, column 19,
Line 60, change "phosphate" to -- phosphato -- .

Claim 16, column 22,
Lines 65 and 60, change "phosphate" to -- phosphato -- .

Claim 17, column 24,
Lines 32 and 36, phosphate" to -- phosphato -- .

Claim 18, column 26,
Lines 58 and 62, phosphate" to -- phosphato -- .

Claim 19, column 29,
Line 64, phosphate" to -- phosphato -- .

Signed and Sealed this

Twenty-eighth Day of August, 2001

*Attest:*

NICHOLAS P. GODICI
*Attesting Officer*    *Acting Director of the United States Patent and Trademark Office*